United States Patent [19]

Zentgraf et al.

[11] Patent Number: 4,764,056
[45] Date of Patent: Aug. 16, 1988

[54] METERING APPARATUS FOR INTRODUCING FREE-FLOWING, POWDERED SUBSTANCES IN A CONTROLLABLE MANNER INTO SPACES UNDER PRESSURE

[75] Inventors: Ernst Zentgraf, Limburgerhof; Heinz Vogt, Ludwigshafen; Franz Brandstetter, Neustadt, all of Fed. Rep. of Germany

[73] Assignee: BASF Aktiengesellschaft, Ludwigshafen, Fed. Rep. of Germany

[21] Appl. No.: 943,486

[22] Filed: Dec. 19, 1986

[30] Foreign Application Priority Data

Dec. 19, 1985 [DE] Fed. Rep. of Germany ....... 3544915

[51] Int. Cl.$^4$ .............................................. B65G 53/46
[52] U.S. Cl. ..................................... 406/68; 406/154
[58] Field of Search ...... 406/63, 68, 64, 154, 406/174; 414/219, 220; 222/402.1, 263, 363, 368, 630; 239/583, 584, 533.15; 110/260, 261, 263, 104 B

[56] References Cited

U.S. PATENT DOCUMENTS

| | | | |
|---|---|---|---|
| 2,244,345 | 6/1941 | Retschy | 239/584 X |
| 3,233,945 | 2/1966 | Kurtz | 406/68 |
| 3,750,911 | 8/1973 | Ebner et al. | 222/254 |
| 3,779,712 | 12/1973 | Calvert et al. | 23/288 E |
| 3,876,602 | 4/1975 | Calvert et al. | 260/94.9 |
| 4,106,702 | 8/1978 | Gardner et al. | 239/584 X |
| 4,316,559 | 2/1982 | McLemore | 222/368 X |

FOREIGN PATENT DOCUMENTS 1175653 3/1962 Fed. Rep. of Germany .
2934817 8/1979 Fed. Rep. of Germany .

Primary Examiner—Galen Barefoot
Assistant Examiner—James M. Kannofsky
Attorney, Agent, or Firm—Keil & Weinkauf

[57] ABSTRACT

A metering apparatus for introducing free-flowing, powdered substances in a controlled manner into spaces under pressure consists of a storing unit, a proportioning unit consisting of a shaft which is sealed in a housing with the aid of sealing rings and glands, can be rotated alternately through 180° in each case and is provided with two depressions opposite one another, for accepting and discharging the substance respectively, an end unit consisting of a cylindrical cavity, which is sealed with the aid of sealing rings and glands and has a nozzle-like shape toward the space under pressure, and a spindle which is arranged concentrically with respect to the cavity, is capable of making to and fro stroke-like movements and, at its tip, has a slope corresponding to that of the nozzle-like feed, the end unit being arranged flush with the wall of the space, a connecting line between the storing unit and the accepting depression within the proportioning unit, a connecting line between the discharging depression within the proportioning unit and the cavity of the end unit, and two connections for inert gas.

1 Claim, 1 Drawing Sheet

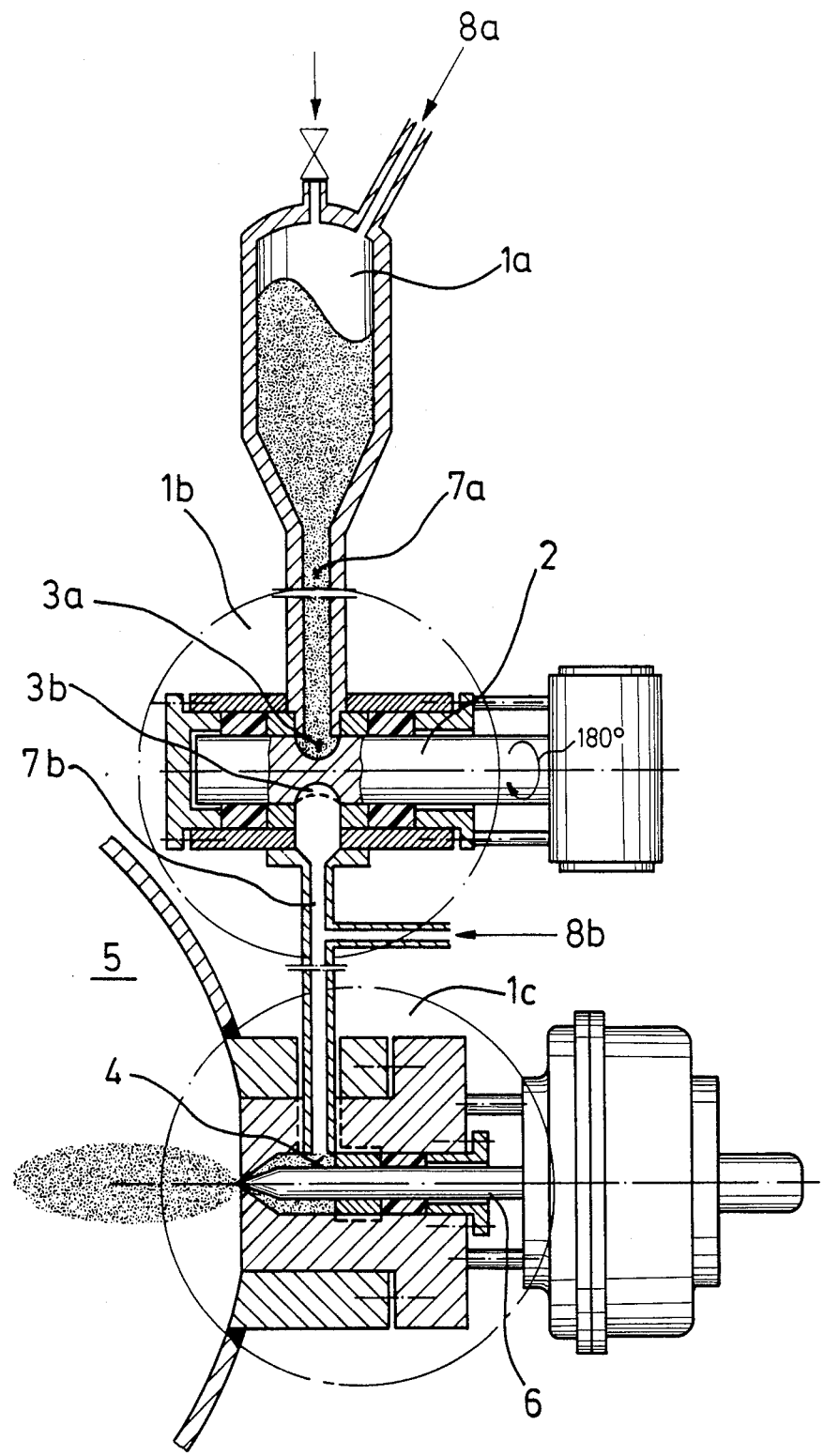

METERING APPARATUS FOR INTRODUCING FREE-FLOWING, POWDERED SUBSTANCES IN A CONTROLLABLE MANNER INTO SPACES UNDER PRESSURE

BACKGROUND OF THE INVENTION AND PRIOR ART

The present invention relates to a metering apparatus for introducing free-flowing, powdered substances in a controllable manner into spaces under pressure.

The said metering apparatus is intended to ensure troublefree addition of free-flowing, powdered substances, especially catalysts, into spaces under pressure, over long periods.

Catalyst metering by means of metering apparatuses used in practice can be divided into three process steps, ie. building up stocks of the catalyst, dividing the catalyst into portions and conveying the catalyst into reaction spaces under pressure. To avoid damage to the catalyst by catalyst poisons or agglomeration due to premature polymerization, the catalyst stock is blanketed with an inert gas. To regulate the amount of catalyst, an amount of catalyst defined by a geometrically specified volume is removed from the catalyst stock and then conveyed into the reaction space under pressure.

Apparatuses necessary for this purpose are known and are also described in the literature.

Four embodiments, described in four publications, are presented by way of example:

German Pat. No. 1,175,653 (I): Apparatus for batchwise metering of powdered substances, wherein metering into the space under pressure is effected by means of an oscillating, horizontally displaced pusher rod having a crosshole.

German Published Application DAS No. 2,062,513 (II): Apparatus for metering powders, wherein metering into the space under pressure is effected by means of an oscillating, vertically displaced plunger possessing a constriction.

German Laid-Open Application DOS No. 2,934,817 (III): Apparatus for introducing solids in a controlled manner into spaces under pressure, wherein metering into the space under pressure is effected by means of a rotating, horizontally arranged truncated cone whose conical surface contains depressions.

German Published Application DAS No. 2,264,412 (IV): This publication describes an apparatus by means of which the catalyst is released from a carrier chamber, as a dispersion or suspension, into the transporting gas, which then passes into the reaction space by a type of pneumatic transportation via a capillary tube.

However, the embodiments described have various disadvantages, which are described below.

In the embodiments according to publications I, II and III, reaction gas is used as a transport medium for the catalyst. Although the gas velocities in the particular transport lines are extremely high, premature polymerization in the transport lines results in these lines constantly becoming blocked. Because of these blockages, the metering apparatuses described frequently have only a short time-on-stream, with all the subsequent difficulties, such as shutting down the plant, cleaning the metering apparatuses, etc.

In the embodiments according to publication IV, the abovementioned difficulties are avoided by using an inert gas for transporting the catalyst. However, this transport gas must flow constantly through a narrow capillary tube at high velocity. A great disadvantage of this embodiment is that very small catalyst agglomerates or oversize particles cause blockages, which finally lead to the same difficulties as described above. Another disadvantage of this embodiment is that a large amount of inert gas is passed into the reaction space.

OBJECT AND SUMMARY OF THE INVENTION

It is an object of the present invention to convey the amount of catalyst defined by predetermined geometric volumes into the reaction space under pressure without the danger of blockage, and at the same time to keep the amount of inert gas passed into the reaction space as small as possible.

We have found that this object is achieved, for a metering apparatus of the type described, by the defining features of claim 1.

BRIEF DESCRIPTION OF THE DRAWING

An embodiment of the invention is shown in the drawing and described in detail below. The drawing shows a section through the metering apparatus according to the invention.

DETAILED DESCRIPTION OF THE PREFERRED EMBODIMENT

The said apparatus consists of a storing unit $1a$, proportioning unit $1b$ and end unit $1c$. The proportioning unit is a shaft 2 which is sealed in a housing by means of sealing rings and glands, can be rotated alternately through 180° in each case and is provided with two depressions $3a$ and $3b$ located opposite one another. The alternate movement is effected by means of a drive. The end unit is a cylindrical cavity 4 which is sealed by means of sealing rings and a gland, receives the catalyst to be metered and is nozzle-shaped toward the space (reaction space 5) under pressure. A spindle 6 which is mounted concentrically with respect to the cavity and to the nozzle-like feed and which is capable of stroke-like to and fro movements by means of a drive is arranged in the cavity, the spindle, when in one zero position, providing a gas-tight seal between the nozzle and the reaction space. Between storing unit $1a$ and proportioning unit $1b$ on the one hand and proportioning unit $1b$ and end unit $1c$ on the other hand are connecting lines $7a$ and $7b$. The storing unit and connecting line $7b$ are equipped with pipe connections $8a$ and $8b$ for inert gas which is at a higher pressure than the pressure in the reaction space, the absolute value of this pressure being adjustable.

For reasons relating to process engineering, it is important that the end unit $1c$ is flush with the wall of the reaction space 5, so that it is impossible for a dead zone to form in the reaction space, in which zone it would be possible for catalyst particles to be deposited. By installing the end unit flush with the reaction space, it is ensured that catalyst particles cannot be deposited at the nozzle outlet, since reaction gas constantly flows around the said outlet.

Metering of the catalyst into the reaction space under pressure is described below. A certain amount of catalyst per unit time is fed to the end unit from the storing unit via the proportioning unit, the amount fed being dependent on the size of the depressions in the shaft and the rotary speed of the shaft. The opening time of the spindle which makes a to and fro stroke is set by means of a time controller so that exactly the amount of catalyst obtained from the proportioning unit per unit time is discharged into the reaction space. During this procedure, the inert gas is let down into the reaction space.

The particular advantages obtained with the invention are that, on the one hand, the novel apparatus makes it possible to achieve very long on-stream times and, on the other hand, the amount of inert gas passed into the reaction space can be substantially reduced.

We claim:

1. Metering apparatus for introducing a free-flowing, powdered substance in a controlled manner into a space under pressure, which comprises housing means, a storing unit, a proportioning unit consisting of a shaft which can be rotated alternately through 180° in each case and is provided with two depressions opposite one another, for accepting and discharging the substance respectively, an end unit consisting of a cylindrical cavity, which has a nozzle-like shape toward the space under pressure, sealing rings and glands being provided for sealing said proportioning unit and said end unit in said housing means, and a spindle which is arranged concentrically with respect to the cavity, is capable of making to and fro stroke-like movements and, at its tip, has a slope the same as that of the nozzle-like feed, the end unit being arranged flush with the wall of the space, a connecting line between the storing unit and the accepting depression within the proportioning unit, a connecting line between the discharging depression within the proportioning unit and the cavity of the end unit, and two connections for inert gas which communicate with said storing unit and the last-mentioned one of said connecting lines, respectively.

* * * * *